Figure 1:
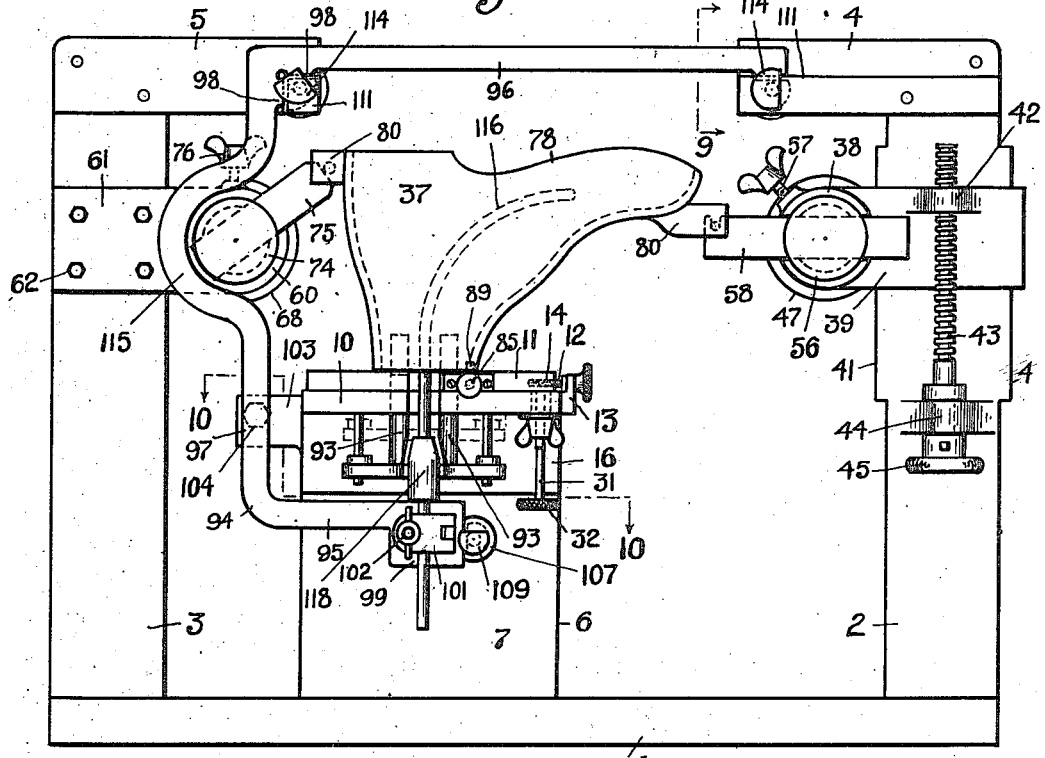

G. C. CLARK.
MOLDING APPARATUS.
APPLICATION FILED DEC. 2, 1915.

1,210,420.

Patented Jan. 2, 1917.
8 SHEETS—SHEET 1.

George C. Clark
INVENTOR.

By George J. Ottsch
ATTORNEY.

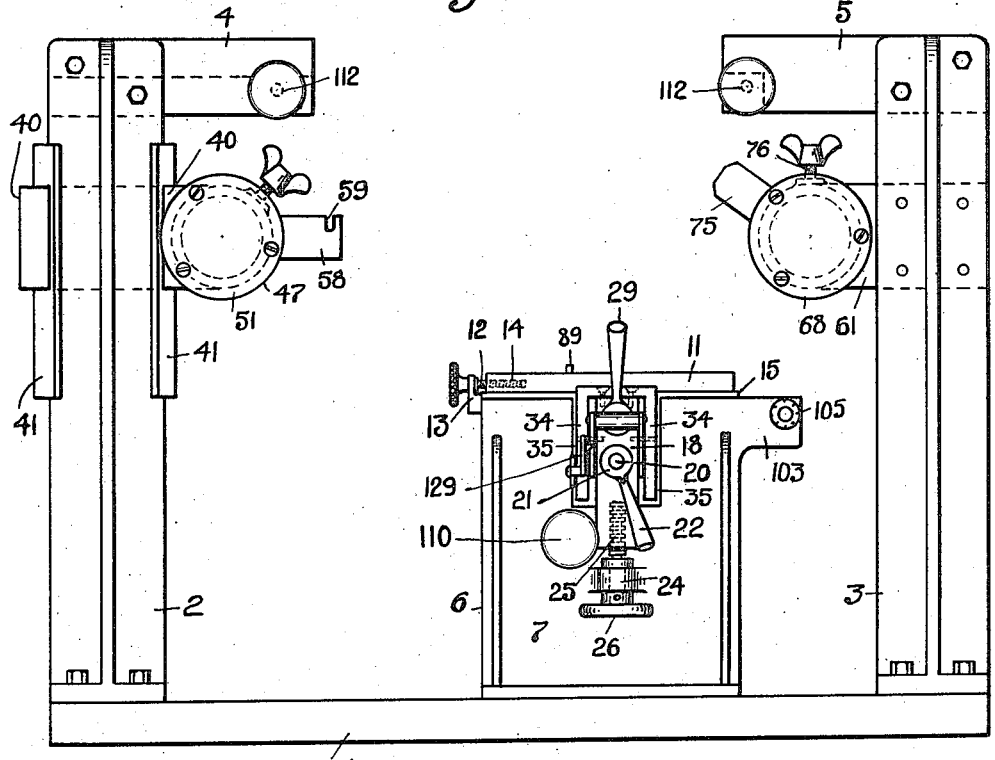
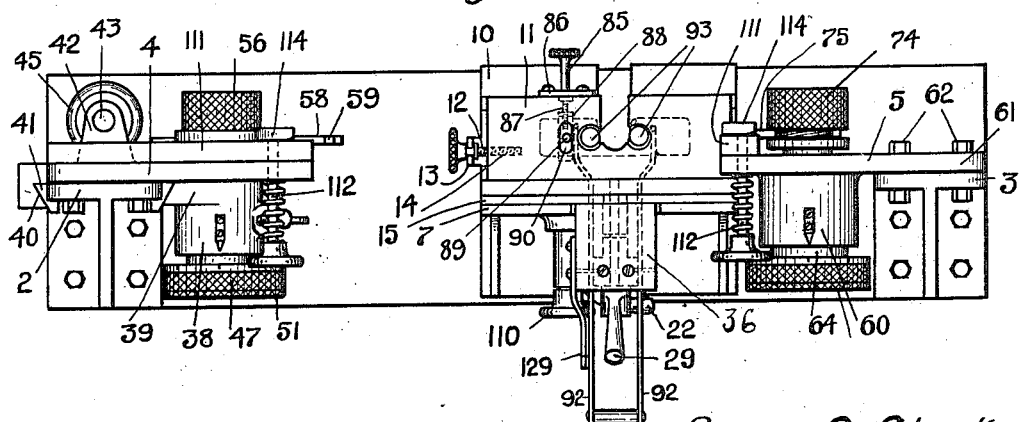

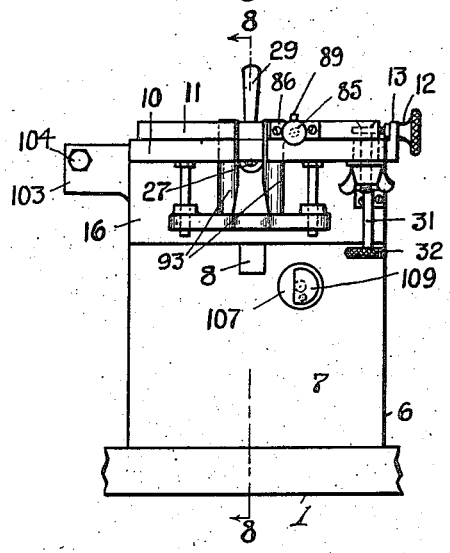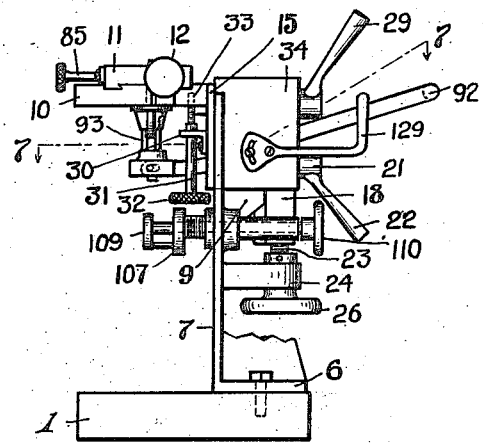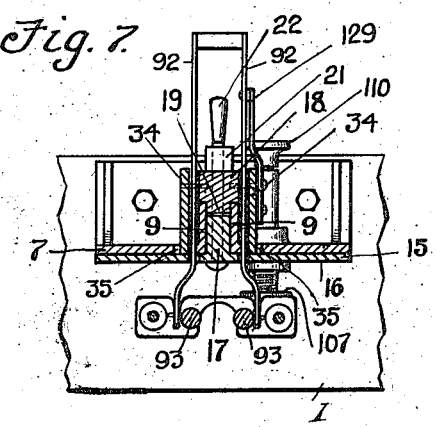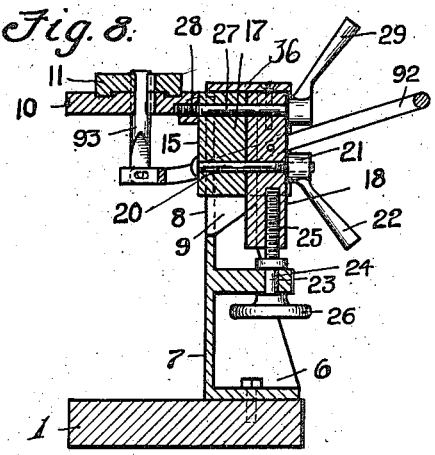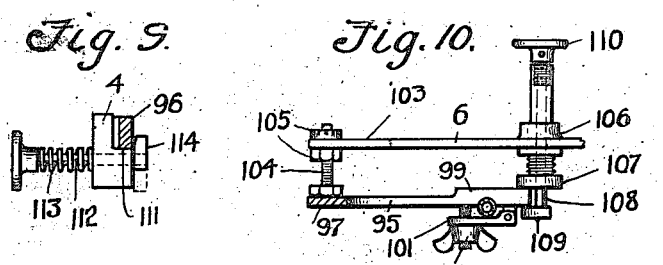

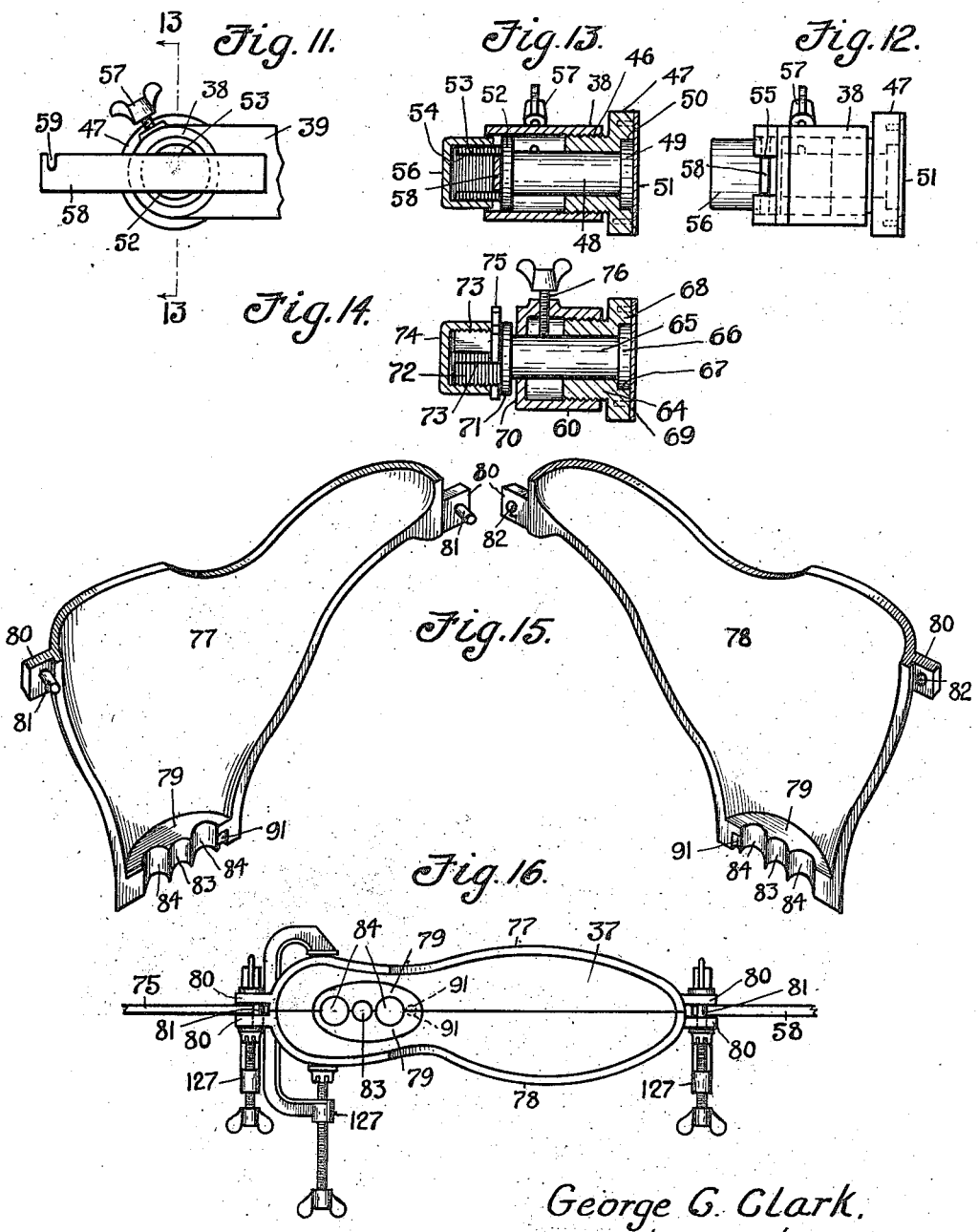

G. C. CLARK.
MOLDING APPARATUS.
APPLICATION FILED DEC. 2, 1915.
1,210,420.
Patented Jan. 2, 1917.
8 SHEETS—SHEET 5.
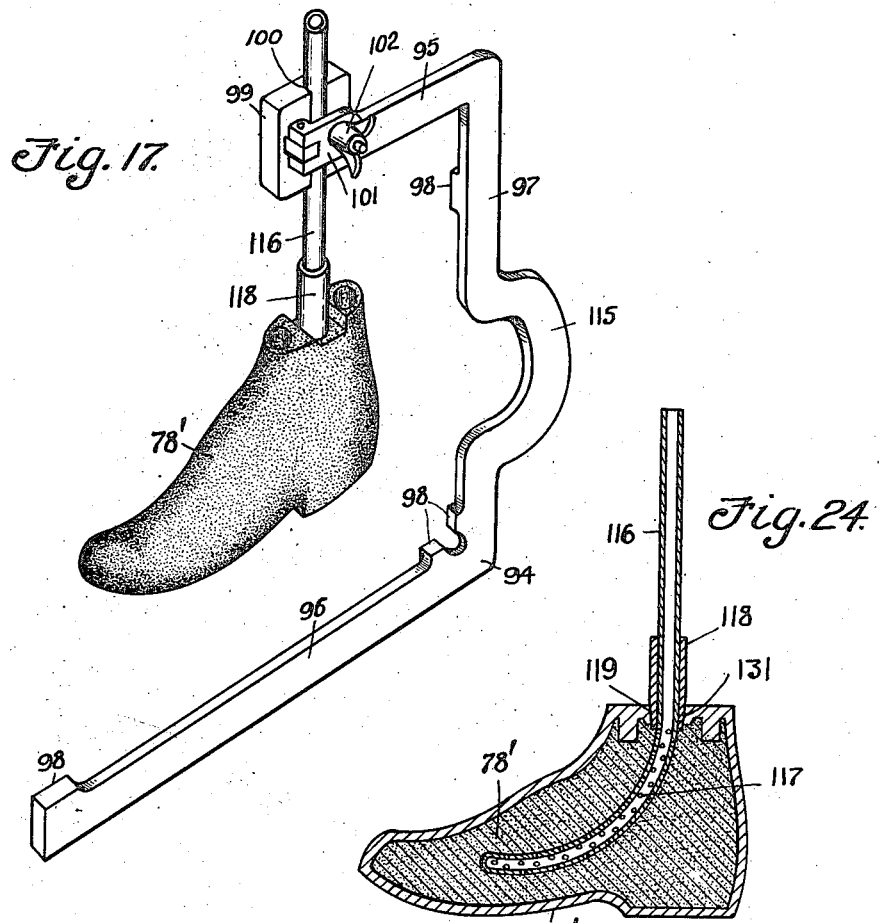
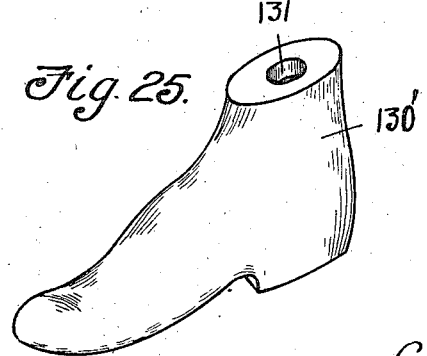
INVENTOR
George C. Clark
BY
George J. Oltsch
ATTORNEY

G. C. CLARK.
MOLDING APPARATUS.
APPLICATION FILED DEC. 2, 1915.

1,210,420.

Patented Jan. 2, 1917.
8 SHEETS—SHEET 6.

George C. Clark,
INVENTOR.
By George J. Ottoch
ATTORNEY.

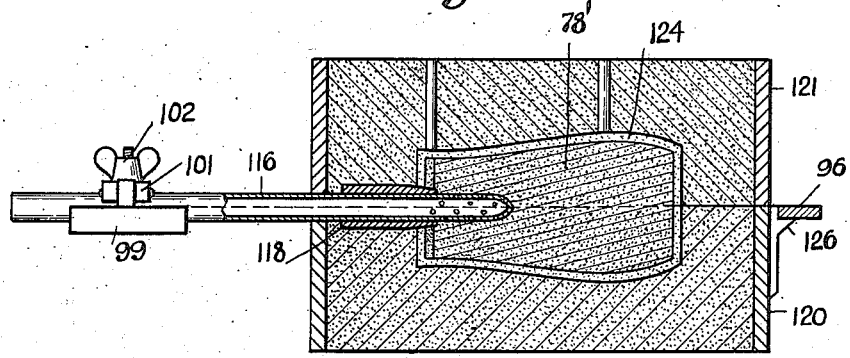
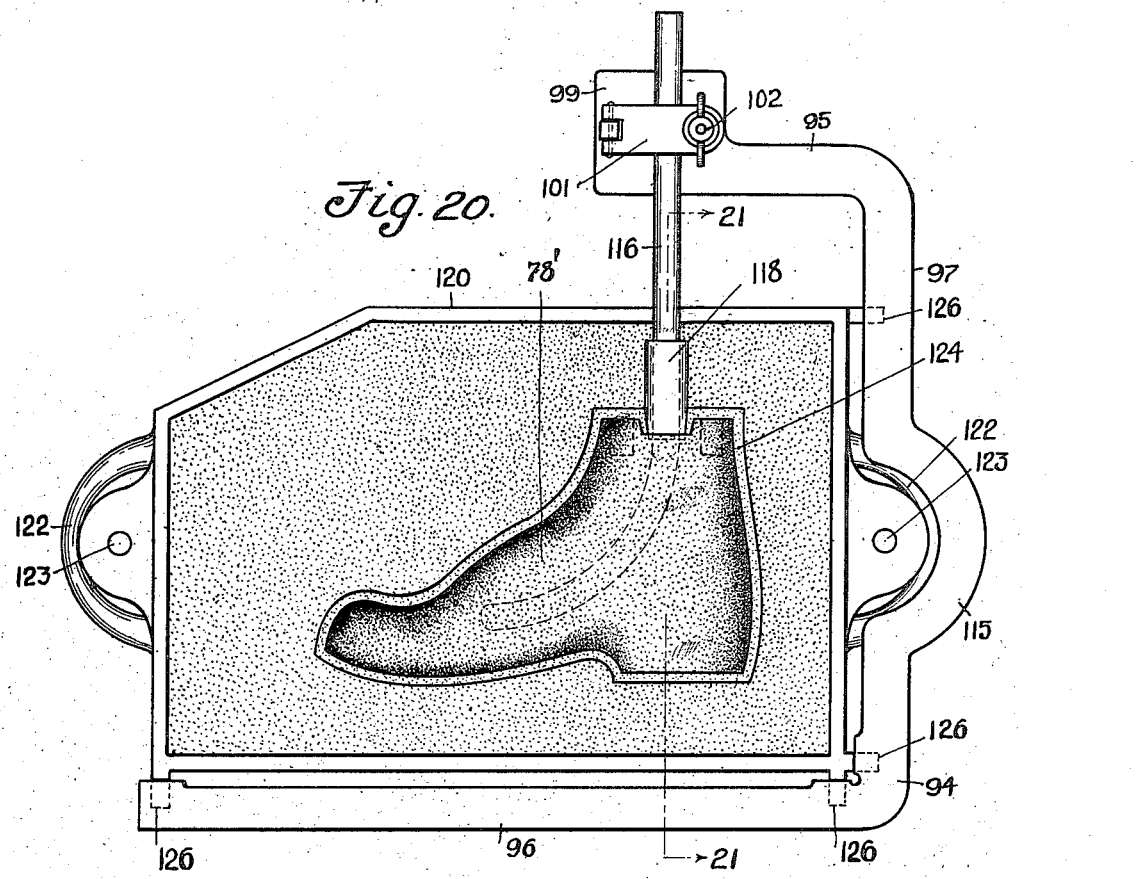

G. C. CLARK.
MOLDING APPARATUS.
APPLICATION FILED DEC. 2, 1915.
1,210,420.
Patented Jan. 2, 1917.
8 SHEETS—SHEET 8.
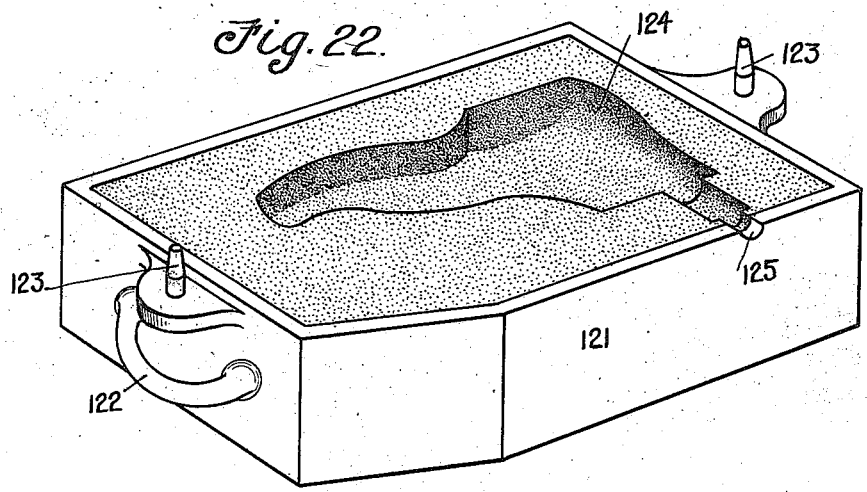
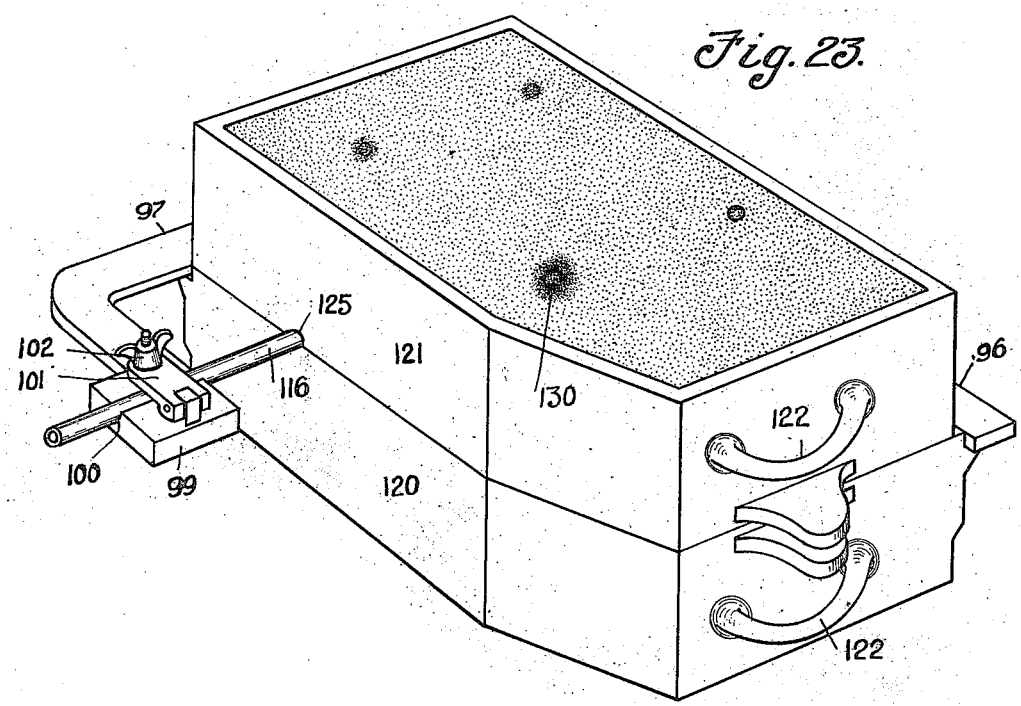
INVENTOR
George C. Clark
BY
*[signature]*
ATTORNEY

UNITED STATES PATENT OFFICE.

GEORGE C. CLARK, OF MISHAWAKA, INDIANA.

MOLDING APPARATUS.

1,210,420. Specification of Letters Patent. Patented Jan. 2, 1917.

Application filed December 2, 1915. Serial No. 64,770.

*To all whom it may concern:*

Be it known that I, GEORGE C. CLARK, a citizen of the United States, residing at Mishawaka, in the county of St. Joseph and State of Indiana, have invented certain new and useful Improvements in Molding Apparatus, of which the following is a specification.

The invention relates to an improvement in molding apparatus of the type designed particularly for use in connection with the molding of hollow metal articles.

In the molding of hollow articles as heretofore ordinarily practised there is provided a mold formed from a pattern to shape the exterior of the article, there being used with the mold a core suitably and separately molded and designed to be arranged within the mold so as to provide a molding space about the core within the mold outline to complete the article. It is essential in this type of molding particularly where it is of importance that the wall of the finished article be of uniform thickness throughout, that the core be absolutely centered with respect to the mold and that it be maintained in such position during the molding operation against possibility of accidental movement.

As heretofore practised, particularly in the molding of lasts, with which the present invention is generally concerned, to support the core from a number of arbors or similar supporting members, in order to insure a fixed relation of the core within the mold, the exact position of the core within the mold has been largely determined by the skill and practice of the operator, with the result that considerable difficulty is experienced in insuring a uniform wall article and a very considerable period of time and unusual amount of labor made necessary in even the few possible adjustments incident to such practice.

The present invention is designed with a view to overcoming all of the difficulties of the present practice, particularly in last molding in providing a member, which may be termed a carrier for the core, which carrier is adapted initially for coöperation with mechanism to permit of the adjustment of the core with relation to the carrier, the carrier and connected core being then transferred as a unit to the mold, the construction of the carrier and mold being such as to cause a specific coöperation to insure an accurate and proper position of the core within the mold.

The invention also contemplates the provision of mechanism, preferably in the form of a concrete machine, with which the carrier may be readily and simply associated, and in which machine the core may be readily and quickly formed and secured to and in desired adjusted relation with the carrier, the mechanical details providing particularly for effective, simple and exceedingly accurate adjustments to position the core with respect to the carrier, to insure an absolutely uniform spacing of the core from the mold wall when the parts are coöperated for molding.

The utilization of a carrier, which as before stated constitutes the main essential of the invention with the mold, with said carrier and mold accurately formed so that the position of the carrier on the mold is absolutely accurate and the same in all applications of the carrier, permits the use of a single arbor or support between the carrier and core, the carrier acting in a measure as a counter-balance to the weight of the core, and the use of a single arbor avoiding the usual number of openings in the finished article which have to be plugged, and hence in this particular avoiding a loss of time and labor.

Generically stated therefore the invention contemplates the use of a core carrier adapted to be associated with a molding machine and a mold, the position of the carrier in each association being the same under all molding repetitions, the molding machine providing for the molding of the core, and permitting the adjustment of the core box in which the core is molded, so that the completed core may have any desired practical adjustment with relation to the carrier, the machine construction permitting the adjustment in a simple, expeditious manner, whereby the maximum of efficiency in the molding of hollow articles having uniform wall thickness, together with the minimum of time and labor for such operation, is a direct result.

Figure 2:
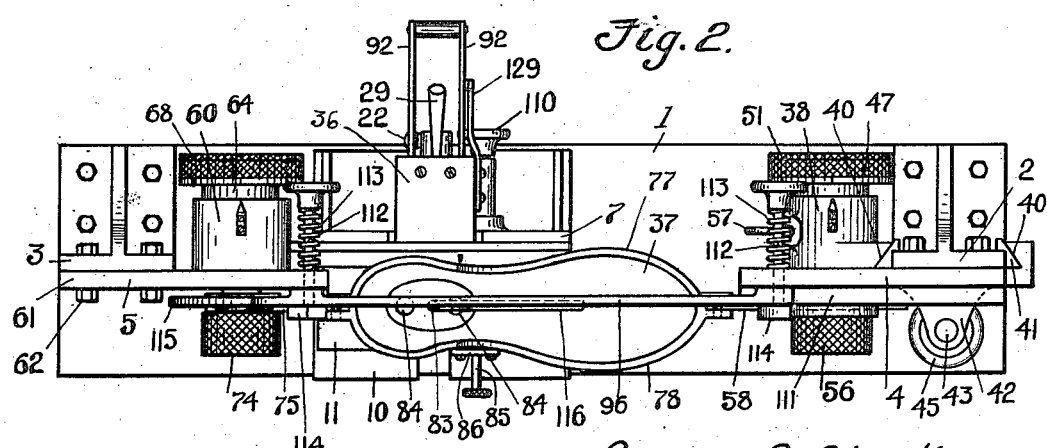
Figure 18:
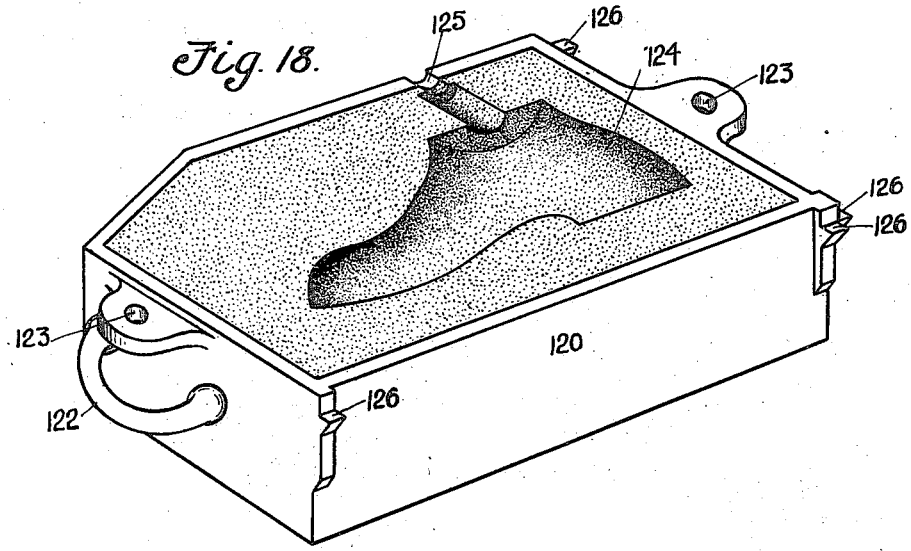
Figure 19:
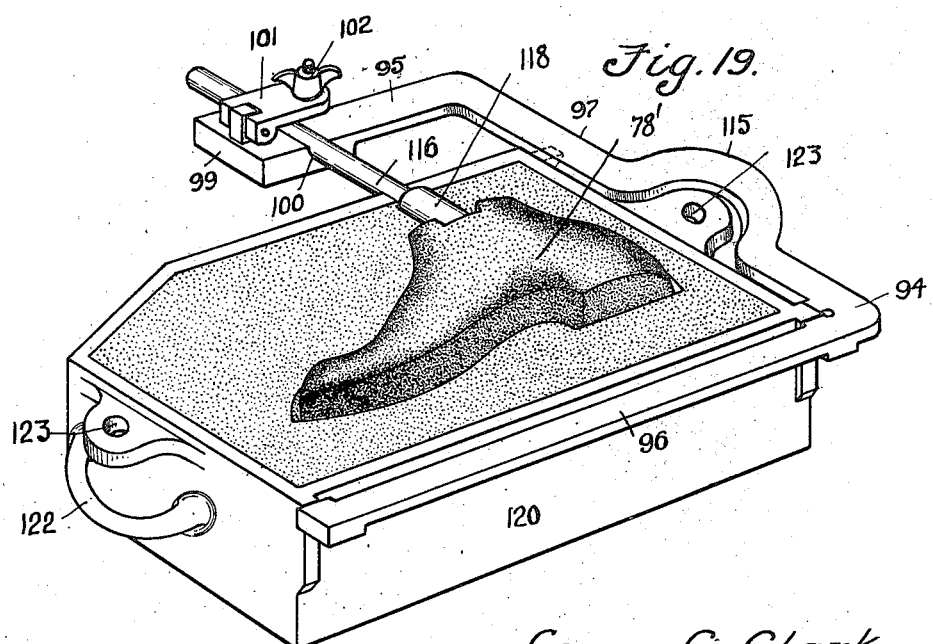

The invention in the preferred form of details will be described in the following specification, reference being had particularly to the accompanying drawings, in which:

Figure 1 is a side elevation of the adjustable molding machine, the carrier and core box being shown in place; Fig. 2 is a plan view of the same; Fig. 3 is an elevation of the machine viewed from the side opposite that of Fig. 1, the carrier and core box being omitted; Fig. 4 is a plan view of the machine as shown in Fig. 3; Fig. 5 is a front elevation of the table for supporting the core box; Fig. 6 is a side elevation of the same; Fig. 7 is a section on line 7—7 of Fig. 6; Fig. 8 is a section on line 8—8 of Fig. 5; Fig. 9 is a section on line 9—9 of Fig. 1; Fig. 10 is a section on line 10—10 of Fig. 1; Fig. 11 is a broken front elevation of one wardly for a comparatively short distance from the upper ends of the uprights 2 and 3, respectively. Removably secured upon the base is a pedestal 6, which latter extends upwardly above the base 1 for a convenient distance. The pedestal 6 is designed to support the table and the various adjusting mechanisms therefor. The pedestal presents a flat bearing plate 7, extending vertically from the base and centrally formed in the upper portion with a vertically extending bears against the relatively outer edges of the webs 9, it is obvious that by means of the clamping nut 21 the block and supporting member may be secured together and to the pedestal against independent vertical movement. The member 20 therefore constitutes a clamping member for the vertical adjustment, and the means for securing such adjustment, with the nicety required, is provided for in an adjusting rod 23 mounted for free rotation, but held against independent vertical movement, in an extension 24 from the plate 7 of the pedestal 6, the upper end of the rod 23 having threaded connection at 25 with an appropriate opening in the block 18, the lower end of the rod having a suitable operating handle 26.

The platform 10 is supported for what might be termed pivotal movement with relation to the supporting member 15, through the medium of a rod 27, passing rotatably through the block 18, and extension 17 of the supporting member and terminally threaded inwardly of the supporting member, as at 28, to engage a threaded opening in the platform. The outer end of the rod 27 is provided with an operating handle 29. Secured upon the plate 16 of the supporting member is a bracket 30, in which, mounted for free rotation but held against independent longitudinal movement, is an adjusting rod 31, the lower end of which is provided with an operating handle 32, and the upper end arranged for threaded connection, at 33, with the platform 10. The clamping rod 27 is arranged about centrally of the length of the platform, while the adjusting rod 31 is disposed adjacent one end thereof, so that the platform may be said to be centrally supported for pivotal movement, and such movement controlled at one end.

Guide plates 34 are arranged in spaced relation to and carried by the block 18, the inner or forward ends of the guide plates being arranged in openings 35 formed in the bearing plate 7 of the pedestal. A top plate 36 is secured upon the block 18, overlying the extension 17 of the supporting member, and the webs 9, whereby to limit the downward adjustment of the parts.

From the foregoing description it is obvious that, through the described use of the adjusting member 12, the table may be adjusted longitudinally of the platform to the desired extent; that through the use of the clamping member 20, and adjusting member 23, the table, through the platform, may be adjusted vertically to the desired extent;
and that, through the use of clamping member 27, and adjusting member 31, the table may be tilted or pivotally adjusted to the desired extent; thereby providing for practically all necessary adjustments of the table in order to arrange for such core box as may be necessary under conditions which will be later explained.

The table constitutes a support for the lower end of the core box, which is arranged in inverted position upon the table, and further adjustments for such core box are provided in means for supporting the upper end of the core box, and in the adjustment of such means. As illustrated the core box 37, hereinafter more particularly described, is inverted when in molding position upon the table 11, and the supporting means now to be described are arranged for coöperation with the upper end of such inverted core box. The adjusting and supporting means for the toe end of the core box, in the particular form illustrated, shown particularly in Figs. 11, 12 and 13, includes a sleeve member 38 disposed at right angles to the length of the main frame, and forming the terminal of a plate 39, having an undercut offset guide-way 40, to slidably embrace similarly formed edges 41 of the upright 2 of the main frame. The plate 39 is formed with an offset web 42, threaded for the reception of a threaded rod 43, which below the threaded portion is mounted for rotation in, but held against longitudinal movement with respect to, an offset 44 on the upright 2. The lower end of the rod 43 is provided with an operating disk or wheel 45, through the use of which it is obvious that the plate 39, and thereby the sleeve 38, may be vertically adjusted with respect to the base plate to the desired extent. That end of the sleeve, that is, what may be termed the inner end in accordance with the previous description, is interiorly threaded at 46 to receive an adjusting member 47, the latter having an enlarged end beyond the sleeve for convenience of operation. Rotatably mounted in the adjusting member is a cylindrical holder 48, said holder extending through the member 47, and having a head 49 arranged in a recess 50, in the enlarged operating end of the adjusting member. By this means the holder is freely rotatable with respect to the adjusting member, but is held against independent longitudinal movement therein, a plate 51 covering the recess 50 to secure the enlarged end 49 of the holder therein. The adjusting member is of materially less length than the sleeve, and the holder extends beyond the adjusting member, being formed, within the length of the sleeve, with a disk enlargement 52 which accurately fits the interior of the sleeve, the holder beyond the disk being in the form of a hollow extension 53, open at diametrically opposite points for a portion of its circumferential area, and throughout its full length as at 54. The sleeve proper is formed with diametrically opposite openings 55, extending from the outer end inwardly, so as to coincide with the openings 54. The open end of the hollow extension 53 of the holder is adapted to be closed by a cap 56, and a set screw 57 extends through the sleeve 38, and is designed to engage the main body of the holder, to secure the latter against rotation when desired.

The supporting member proper for the core box is in the form of a strip 58, of a size to be passed longitudinally through the registering openings 53 and 55, the end next the core box being formed in the upper edge of the strip with a notch or depression 59. Obviously, by rotating the member 47, a lateral adjustment of the strip 58, may be had. The adjusting member for the opposite or heel portion of the core box, as particularly shown in Fig. 14, involves a thimble like member 60, forming a rigid part of the plate 61, secured by bolts 62 to the upright 3 of the main frame. The annular wall of the member 60 extends at right angles to the length of the main frame, that is, in parallel relation to the sleeve 38 of the opposite adjusting member, and the open end of the member 60 is threaded to receive an adjusting member 64, in which is rotatably mounted a holder 65, the latter having a head 66 to seat in a recess 67 in the enlarged end 68 of the adjusting member 64, a plate 69 covering the recess, so that the holder is mounted for rotation in but held against independent longitudinal movement with respect to the adjusting member. The holder extends through an opening in the otherwise closed end 70 of the thimble member 60, and beyond said end is provided with a disk enlargement 71, having a hollow threaded extension 72, formed with longitudinally extending diametrically opposite openings 73. The extension 72 is exteriorly threaded to receive a locking cap 74. A supporting strip 75 designed to directly coöperate with the core box as hereinafter stated, is passed through the openings 73 to the desired extent, and locked with relation to the holder by the cap 74. The holder is adjusted longitudinally of the fixed thimble member 60, by the adjusting member 64, to obtain lateral adjustment of the strip, and the strip may be further adjusted in a vertical plane by a rotary movement of the holder, a set screw 76 passing through the thimble member and engaging the holder, to secure the latter in desired position relative to its rotary adjustment.

The core box, illustrated in the present instance as in the form of a last, but designed to indicate thereby any type of core box, is formed in two sections, 77 and 78, which are practical duplicates of each other, each section forming one longitudinal half of the box. As supported upon the table, that is in inverted position as previously noted, the core box is sufficiently open at the upper end, the lower end of each section having a closure 79 which, when the sections are in connected relation, close the lower end of the core box as will be evident. The core box sections are formed adjacent their meeting marginal edges at the upper ends of the box, as applied, with lugs 80, one of which of each set is formed with a pin 81 to seat in an opening 82 in the other of such set. The sections are thus held against vertical displacement, and the lugs 80 are spaced apart, so that a portion of the pins bridge the space between them, to be engaged by the respective supporting strips 58 and 75 hereinbefore referred to. The closure formed by the sections 79 at the lower end of the core box is formed with a central opening 83, and with oppositely disposed openings 84, which openings serve a function which will later appear.

In connection with the adjustments previously described for the core box, I have provided an additional adjustment which permits a slight independent adjustment of the core box without regard to its supporting structure. This adjustment involves an adjusting rod 85 arranged in and projected transversely of the table 11, being mounted in a bracket plate 86, secured to one edge of the table in such a manner as to permit free rotary movement of the adjusting rod 85, but prevent independent longitudinal movement. That end of the portion of the rod 85, underlying the table is threaded at 87, to engage a sliding bracket 88 mounted for movement transversely of the table, and provided with an upstanding pin 89, which extends through a slot 90 of elongated form and arranged transversely of the table. The respective sections of the core box are formed, in their meeting edges of the bottom closure 79, with depressions 91 which together constitute an opening into which, when the core box is in place on the table, the pin 89 enters. Manipulation of the adjusting rod 85, will therefore independently adjust the core box on the table in an obvious manner.

As it frequently happens that the completed article, particularly when in the form of a last, requires additional thickened lugs at the upper end of such article, whereby to provide for additional supports when using the last for making boots or shoes, I have provided for such contingency by pivotally mounting, between the guide plates 34 and the block 18, the supporting arms 92 of an operating frame, the forward end of which arms, inwardly beyond the supporting member 15 of the adjusting mechanism, are bent laterally and terminally connected to molding pins 93, which when the parts are in applied position, are through the operation of the frame forced upwardly through the platform and table, and through the openings 84 in the core box, to provide openings in the core for lug forming purposes.

The above description has been directed primarily to the molding machine, wherein the core for molding the completed article is constructed, the detail description having more particular relation to the adjusting means for the core box, in which the core 78' is molded. It is to be understood that the particular type of adjusting mechanisms described in the various instances is of particular use in connection with a core box designed for the production of a core for molding lasts, and that such adjusting mechanisms are designed to this end, although obvious mechanical changes are contemplated in such mechanisms in order to adapt such for the use of a core box designed to mold a core for any other distinctive article.

An important and salient feature of the present invention resides in a means, designated generally as a carrier, and designed for coöperation with the molding machine described, and with the drag of the two-part flask, in which the actual molding operation of the completed article is carried out. This carrier is illustrated particularly in Fig. 17, from which it will be seen that the carrier comprises a frame 94, involving comparatively a narrow strip like member including parallel upper and lower portions 95, 96, the former being of materially less length than the latter, and a connected portion 97. At particular points, and in this essential such points may be any points selected with a view to their efficiency, the frame strip is thickened or otherwise enlarged, as at 98, and said points are carefully machined so as to produce an absolutely accurate bearing surface in strict accord with the results desired. The free end of the upper arm 95 of the carrier frame is enlarged to form a combined bearing and weight 99, and in such enlarged portion there is formed a recess 100, extending at right angles to the arm 95, the clamp plate 101 being arranged to overlie the recess, and to be disposed in clamping relation thereto by set screw 102.

As will be noted from Fig. 1 of the drawings, the main frame of the molding machine is designed to removably receive and support the carrier, and this detail also is of particular importance. The pedestal 6 is formed with an offset 103, in which is threaded a headed bearing screw 104 (see Fig. 10), having locking nuts 105. Remote from the bearing screw 104, the plate 7 of the pedestal is provided with a threaded thimble 106, in which is threaded a second headed bearing screw 107. The bearing screw is hollow to permit the passage therethrough of a locking rod 108, on the outer end of which is provided an irregular shaped locking head 109, and on the inner end of which is arranged an operating member 110. The respective free ends of the top bars 4 and 5 are formed with bearing sections 111, the former being preferably formed by cutting away the arm in the upper portion thereof and the latter by providing the block to be secured to the arm and forming right angularly related surfaces. Locking rods 112, preferably spring pressed through the medium of springs 113 pass through the respective bars, contiguous bearing sections 111, and are formed on their forward or outer ends with irregular shaped locking heads 114.

As previously stated the carrier frame is provided at desired points with carefully machined bearing surfaces, and for the purpose of this particular use such surfaces are shown adjacent the juncture of the arms 96 and 97, presenting at such point a right angularly related bearing surface, near one end of the arm 97 remote from the arm 96, and at the free end of the arm 96.

The carrier is applied to the molding machine, so that the bearing surfaces of the carrier will contact with the bearing points of the machine just described; that is to say, the carrier, which in use on the machine is inverted from the position shown in Fig. 17, presents the angular bearing points 98, at the juncture of the arms 96 and 97, on the respective edges of the bearing block at the free terminal of the bar 5, while the free end of the arm 96 presents its bearing surface on bar 4. The free end of arm 95 of the carrier bears on the adjusting screw 107 while the arm 97 of the carrier bears on the adjusting screw 104, the arm 97 of the carrier being formed with an offset 115 to extend around the thimble 60. It is of course to be understood that the screws 104 and 107 are adjusted so as to maintain an absolutely vertical alinement with the fixed bearing surfaces of the main frame, so that when the carrier frame is applied and the locking heads, which may be and preferably are of cam formation, are turned, the carrier is locked to the machine frame.

The bearing of the carrier with respect to the machine frame is of special importance, and as will be particularly noted from Fig. 2 of the drawings, that surface of the carrier frame which, in accordance with the previous description may be termed the inner surface, is in exact alinement with the vertical central plane of the core box as normally positioned upon the table, which is to say that if the core were molded with the table in absolutely normal position the vertical longitudinal plane of such core would coincide exactly with the inner surface of the carrier, that is to say, the surface of such carrier opposite the bearing surfaces thereof.

The carrier is designed as a means for supporting an arbor 116, which for the purpose of last molding herein shown, is in the form of a pipe like section having that end adapted to be projected within the core curved to facilitate its supporting function, that portion of the hollow arbor designed to rest within the core being perforated as at 117, Fig. 24, and the free end of the arbor being open to permit the escape of steam or the like as is usual. The arbor is provided with a sleeve 118 loosely and slidably encircling the same, and having an operative end beveled as at 119, for the purpose which will later appear. The arbor is secured to the carrier by positioning the same in the recess 100 of the enlargement 99 of the carrier and clamping the arbor therein by the clamp 101.

In connection with the molding machine for the formation of the core, the improved apparatus includes the use of a two-part flask which aside from the essentials to be hereinafter specifically described may be of any usual type. This flask, generally speaking, includes the drag 120 and the cope 121, each provided with the usual handles 122, and having the coöperating positioning means as pins and openings 123. The mold outline 124 is formed in the flask parts in any usual or preferred manner from a pattern, having the external dimensions of the sizes desired, and the meeting edges are formed at an appropriate point with an opening 125 for the reception of the arbor. The essential characteristic of this detail of the invention is the provision of the drag member of the flask with offsets 126, positioned and arranged to coöperate with the bearing points 98 of the carrier. The offsets 126, which may be termed supporting abutments, are carefully machined and so positioned that that surface of the carrier, hereinbefore referred to as the guiding surface, or the surface in the vertical longitudinal central plane of the core box in normal position, is absolutely and accurately alined with the upper surface of the drag when the carrier is applied thereto. In other words with the carrier in position, the guiding surface is in absolute alinement with the central plane of the mold recess.

The operation may be briefly described as follows: The carrier is applied to the machine frame as described, the arbor positioned so as to occupy a proper relation to the interior of the core box, the table and platform being slotted to permit such positioning of the arbor, and the core box applied to the table, suitable clamps 127 operating to hold the sections of the core box connected. The core box is supported on the table and by the strips 58 and 75. In this position, as previously described, the vertical longitudinal central plane of the core is in exact alinement with the guiding surface of the carrier. A green sand core is then formed, by suitably filling and tamping the material within the core box, which operation is obviously performed in a speedy manner, the frame arms 92 having been operated if desired to project the molding pins 93 into the core box the desired distance. In this use the frame is held in the operated position by a spring latch 129 secured to one of the guide plates 34 of the adjusting mechanism. After formation of the core, the core box is removed, and the core carried on the arbor and the latter supported solely by the carrier for removal from the machine. A pattern having been used to form the mold outline in the flask, the core is applied to such mold, by positioning the carrier with its bearing points on the bearing points 126 of the drag. The casting operation is performed by pouring the material through the usual pour gate 130, and the completed article 130' removed from the mold. Previous to the casting operation, the sleeve 118 is moved down the arbor into contact with the core, so that as the article is cast thereabout said sleeve forms an opening 131 in the upper end of the article. After molding the sleeve is dislodged from the article by a series of light blows from a suitable implement, the beveled end 119 of the sleeve facilitating such operation. The material of the core is broken up in the usual manner and the arbor and such material removed from the interior of the article. The article thus formed is then divided longitudinally or otherwise by a saw or the like and the sections investigated to determine where, if at any place, the wall of the completed article is not uniform with the desired thickness. Having determined the points of such non-uniformity, the carrier is reapplied to the molding machine, the arbor arranged in position thereon, and the core box reapplied for the molding of a second core. Previous to such molding however, through proper manipulation of any one or more of the adjusting mechanisms, the core box is adjusted with relation to the guiding surface of the carrier, so as to position the core to be formed with such adjustment with relation to said guiding surface of the carrier, as to compensate for irregularities in the wall of the completed article, made apparent by inspection of the previously formed article from the normally positioned core. These adjustments having been perfected the second core is molded, and the casting operation of the completed article proceeded with as before described. The result under these circumstances will be the completed article having an absolutely uniform wall and hence a requisite strength at all parts.

Of course the core for each casting operation is constructed for such particular operation thereof, and it will be understood that having once adjusted the core box with relation to the guiding surface of the carrier, all cores will be absolutely uniform in their adjusted relation to such surface, and hence no change whatever will be necessary in the apparatus for the production of completed articles of a particular size and shape. Any change in the size or shape of the article itself will of course require a new operation involving a trial article, and subsequent adjustment of the core box, if necessary.

The essential and characteristic feature of the present invention is the provision of a carrier, having a definite fixed relation with a molding machine, and a definite fixed relation with a molding flask, and as an essential addition the provision of means whereby the arrangement of the parts for the molding of the core may be adjusted so that the core may have, within limits, any desired adjusted relation with such guiding surface of the carrier, as may be necessary to accurately cast the completed article in the manner described. It is of course obvious that the necessary adjustments of the mold box will in their maximum degree be comparatively slight, and hence the provision for independent movement of the parts to permit such adjustment is correspondingly slight. Another and important characteristic resultant from the use of the carrier, is that I am enabled to support the core therefrom by a single member, namely, a single arbor, as the latter remains at all times in fixed relation to the carrier and provides an efficient support, in that the enlarged portion 99 of the carrier frame operates in effect to counterbalance the weight of the core, being arranged opposite the core with relation to the edge of the drag, which latter may thus be said to serve in a measure as a fulcrum. The completed article will thus have but a single opening, and the usual plugging heretofore necessary in molding hollow metallic lasts through the use of a plurality of supporting arbors or members, is entirely avoided.

The use of the carrier having a guiding surface adapted for fixed position with relation to the drag, and also with fixed position with relation to a machine in which the core is molded, with relation to which guiding surface the molding essentials for the core may be adjusted, constitutes mechanism cooperating to produce hollow articles of uniform wall thickness in a manner effecting a material saving of both time and labor over the present means in use for manufacturing said articles.

The subject-matter disclosed by Sheets 5 to 8 (Figs. 17 to 25) is claimed in applicant's co-pending application 64,771.

What is claimed is:

1. A core molding machine, including a core box supporting element, a core carrier adapted for temporary fixed relation to the machine, and means for adjusting the element with respect to the carrier.

2. A core molding machine, including a core box supporting element, a core carrier adapted for temporary fixed relation to the machine, and means for adjusting the element with respect to the carrier, and core box supports beyond the element.

3. A core molding machine, a carrier adapted for temporarily fixed relation therewith, a core box supporting element, a core support secured by the carrier, and means for adjusting the element independently of the support.

4. A core molding machine, a carrier adapted for temporarily fixed relation therewith, a core box supporting element, a core support secured on the carrier, and means for adjusting the element independently of the support, and with particular relation to the carrier.

5. A molding apparatus including a mold box supporting element, a carrier for the molded article and having a removably fixed position with relation to the element, and means for adjusting the table to vary the position of the article molded thereon with respect to the carrier.

6. A molding apparatus including a core molding machine, an article casting machine, a carrier having a temporarily predetermined fixed relation in each of said machines, an element forming part of the core molding machine for the support of a core box, and means for adjusting said element with respect to the predetermined position of the carrier on said core molding machine.

7. A molding apparatus including a core molding machine, an article casting apparatus, the carrier having spaced bearing points, said machine and apparatus being formed with bearing sections to accurately position the carrier with respect to said parts in each application of the carrier thereto, and means carried by the core molding machine to adjustably provide for the molding of a core.

8. A core molding machine including a main frame, a pedestal rising therefrom, a core box supporting table, a core carrier, and means intermediate the table and pedestal for adjusting the table with relation to the pedestal.

9. A core molding machine including a main frame, a pedestal rising therefrom, a core box supporting table, a core carrier, and means intermediate the table and pedestal for adjusting the table with relation to the pedestal, and means for locking the table in adjusted position.

10. A core molding machine including a main frame, a core supporting element adapted to be temporarily secured in fixed relation to said frame, core box supporting means, mechanism for adjusting said means with relation to the element, said means being wholly free of direct connection with the element under any position of adjustment.

11. The combination with a core molding machine and a two-part flask, of a core carrier adapted for temporary connection with the molding machine to support the carrier in a fixed position in said machine, and means provided on one section of the two-part flask to receive and support the carrier in a predetermined relation to the flask.

12. In a molding apparatus, a core carrier formed with bearing points, a core molding apparatus formed with bearing sections to coöperate with said bearing points to definitely position the carrier on the machine, and a two-part flask provided with supporting means to coöperate with the bearing points of the carrier to arrange said carrier in a predetermined position on the flask.

13. In a molding apparatus, a core carrier formed with bearing points, a core molding apparatus formed with bearing sections to coöperate with said bearing points to definitely position the carrier on the machine, and a two-part flask provided with supporting means to coöperate with the bearing points of the carrier to arrange said carrier in a predetermined position on the flask, and adjustable mold positioning mechanism carried by the molding machine.

14. A core molding machine, a core supporting element adapted to be temporarily secured in fixed position on the machine, a core box supporting means, mechanism for adjusting the core box supporting means with relation to said element, and means carried by the core box supporting means for adjusting the core box relatively thereof.

15. A core molding machine, a core supporting element adapted to be temporarily secured in fixed position on the machine, a core box supporting means, and mechanism independent of and beyond said means for adjustably supporting the core box with relation to said element.

16. A core molding machine, a core supporting element adapted to be temporarily secured in fixed position on the machine, a core box supporting means, mechanism for adjusting said means with relation to said element, and core box supporting members independent of said supporting means for adjustably supporting portions of the core box remote from said means.

In testimony whereof I affix my signature in presence of two witnesses.

GEORGE C. CLARK.

Witnesses:
JOHN F. DUCEY,
F. HENRY WARZER.